United States Patent
Rigal et al.

(10) Patent No.: US 10,399,191 B2
(45) Date of Patent: Sep. 3, 2019

(54) METHOD FOR PRODUCING A HEAT EXCHANGER MODULE HAVING AT LEAST TWO FLUID FLOW CIRCUITS

(71) Applicant: COMMISSARIAT A L'ENERGIE ATOMIQUE ET AUX ENERGIES ALTERNATIVES, Paris (FR)

(72) Inventors: Emmanuel Rigal, Sassenage (FR); Lionel Cachon, Manosque (FR); Jean-Marc Leibold, Pont de Claix (FR); Isabelle Moro-Le Gall, Fontaine (FR); Fabien Vidotto, Fontaine (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 626 days.

(21) Appl. No.: 14/890,357

(22) PCT Filed: May 9, 2014

(86) PCT No.: PCT/IB2014/061319
§ 371 (c)(1),
(2) Date: Nov. 10, 2015

(87) PCT Pub. No.: WO2014/181297
PCT Pub. Date: Nov. 13, 2014

(65) Prior Publication Data
US 2016/0107274 A1 Apr. 21, 2016

(30) Foreign Application Priority Data
May 10, 2013 (FR) .................................. 13 54224

(51) Int. Cl.
*F28D 9/00* (2006.01)
*F28F 3/12* (2006.01)
(Continued)

(52) U.S. Cl.
CPC ............ *B23P 15/26* (2013.01); *B23K 20/021* (2013.01); *F28D 9/0037* (2013.01); *F28F 1/00* (2013.01);
(Continued)

(58) Field of Classification Search
CPC ..... B23P 15/26; F28F 1/00; F28F 3/12; F28F 3/048; F28F 21/083; F28F 2275/061;
(Continued)

(56) References Cited

U.S. PATENT DOCUMENTS 4,408,833 A    10/1983   Gowan
5,249,359 A    10/1993   Schubert et al.
(Continued)

FOREIGN PATENT DOCUMENTS

EP    1 125 630 A2    8/2001
FR    2 879 489 A1    6/2006
(Continued)

OTHER PUBLICATIONS

G. Le Marois, E. Rigal, P. Bucci. "Fusion reactor first wall fabrication techniques." Fusion Engineering and Design 61-62 (2002) pp. 103-110.
(Continued)

*Primary Examiner* — David P Bryant
*Assistant Examiner* — Lee A Holly
(74) *Attorney, Agent, or Firm* — Oliff PLC

(57) ABSTRACT

A method for producing heat exchangers having at least two fluid circuits each having channels, including the following steps: producing one or a plurality of elements of a first fluid circuit, each element having at least two metal plates, at least one of which has first grooves; stacking the at least two metal plates of each element in such a way that the first grooves form the channels of the first circuit; assembling each element of the first circuit by diffusion welding
(Continued)

between the two stacked metal plates; producing one or a plurality of elements of at least one second fluid circuit, each element of the second circuit having at least a portion of the channels of the second circuit; assembling, either by diffusion welding, or by brazing, or by diffusion brazing between the element or elements of the first circuit and the element or elements of the second circuit.

27 Claims, 5 Drawing Sheets

(51) Int. Cl.
| | |
|---|---|
| *B23K 20/02* | (2006.01) |
| *B23P 15/26* | (2006.01) |
| *F28F 21/08* | (2006.01) |
| *F28F 3/04* | (2006.01) |
| *F28F 1/00* | (2006.01) |
| *B23K 103/04* | (2006.01) |
| *B23K 103/10* | (2006.01) |
| *B23K 103/12* | (2006.01) |
| *F28D 21/00* | (2006.01) |

(52) U.S. Cl.
CPC ............... *F28F 3/048* (2013.01); *F28F 3/12* (2013.01); *B23K 2103/04* (2018.08); *B23K 2103/05* (2018.08); *B23K 2103/10* (2018.08); *B23K 2103/12* (2018.08); *F28D 2021/0054* (2013.01); *F28F 21/083* (2013.01); *F28F 2275/061* (2013.01)

(58) Field of Classification Search
CPC .......... F28D 9/0037; F28D 2021/0054; B23K 20/01; B23K 2203/05; B23K 2203/04; B23K 2203/10; B23K 2203/12
See application file for complete search history.

(56) References Cited

U.S. PATENT DOCUMENTS

| | | | | |
|---|---|---|---|---|
| 6,478,214 | B1* | 11/2002 | Rigal | .................. B23K 20/021 |
| | | | | 228/193 |
| 2008/0116246 | A1* | 5/2008 | Rigal | .................. B23K 20/021 |
| | | | | 228/193 |
| 2012/0168078 | A1 | 7/2012 | Couturier et al. | |

FOREIGN PATENT DOCUMENTS

| | | |
|---|---|---|
| JP | H10-054688 A | 2/1998 |
| JP | 2005-288521 A | 10/2005 |
| JP | 2008-039255 A | 2/2008 |
| WO | 2006/067349 A1 | 6/2006 |
| WO | 2011/026925 A1 | 3/2011 |
| WO | 2011/036207 A1 | 3/2011 |
| WO | 2013/150458 A1 | 10/2013 |

OTHER PUBLICATIONS

Jul. 8, 2014 International Search Report issued in International Patent Application No. PCT/IB2014/061319.

Jul. 2, 2018 Office Action issued in Japanese Application No. 2016-512470.

* cited by examiner

Detail B

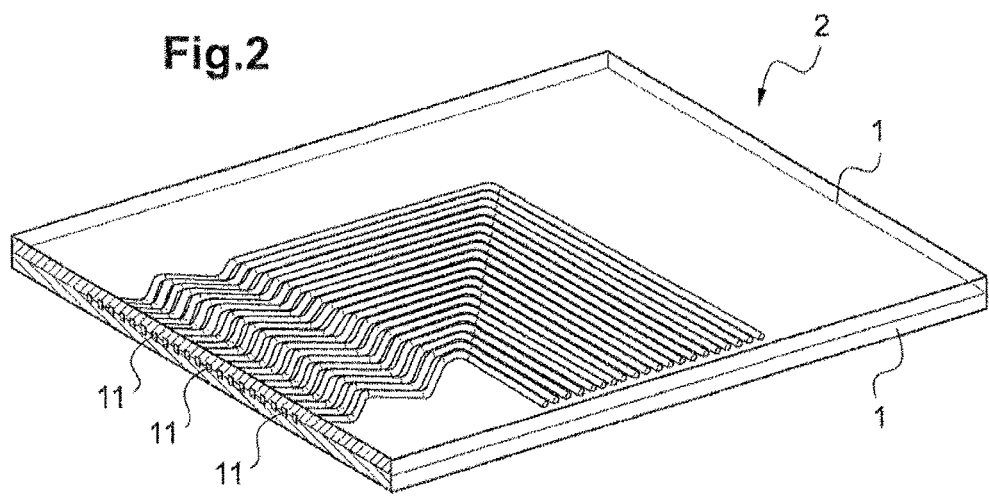
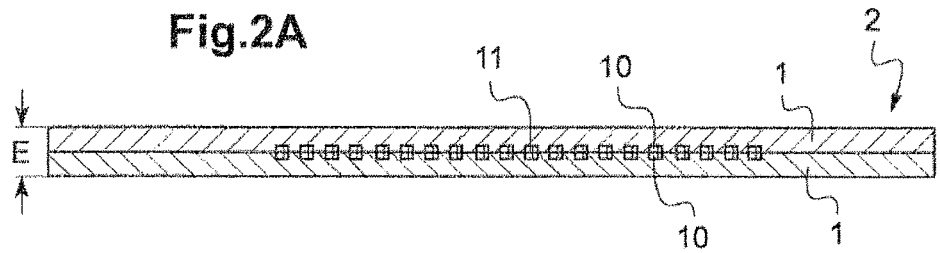

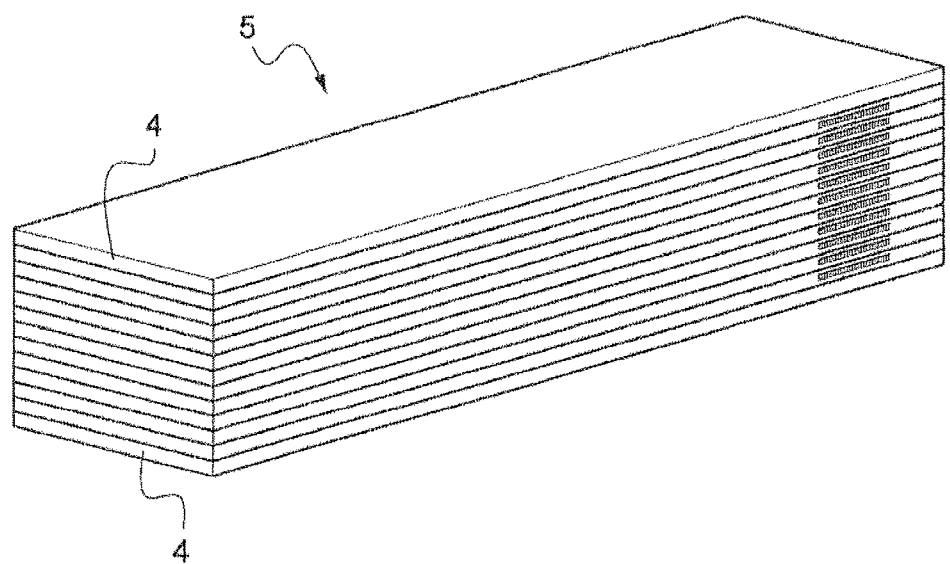
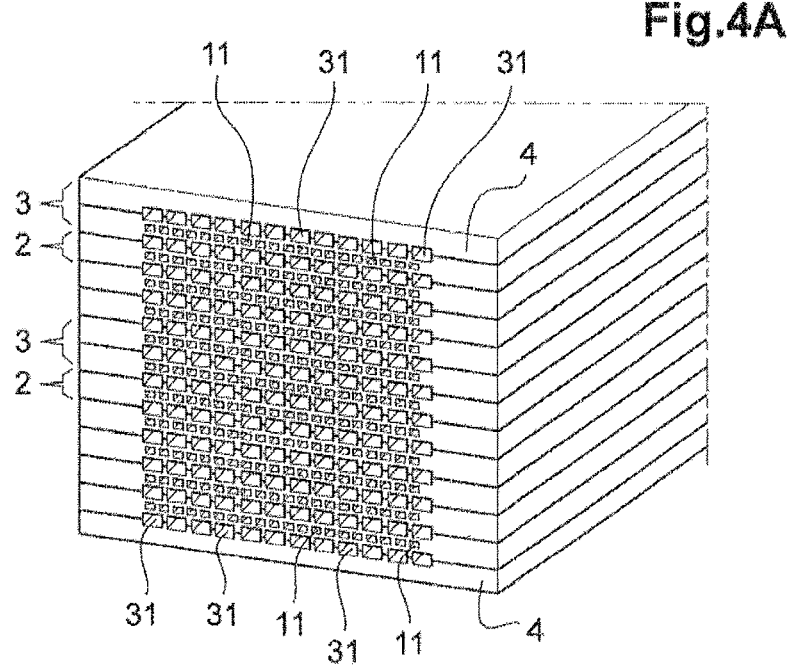

METHOD FOR PRODUCING A HEAT EXCHANGER MODULE HAVING AT LEAST TWO FLUID FLOW CIRCUITS

TECHNICAL FIELD

The present invention relates to heat exchangers having at least two fluid circuits each comprising channels.

The invention more specifically relates to a new production method for such exchangers by means of diffusion welding obtained by the technique of hot isostatic pressing (HIP).

Known heat exchangers comprise either one or at least two internal fluid circulation channel circuits. In exchangers having a single circuit, the thermal exchanges are carried out between the circuit and a surrounding fluid in which it is immersed. In the exchangers having at least two fluid circuits, the thermal exchanges are carried out between the two fluid circuits.

There are known chemical reactors which implement a continuous method according to which a small quantity of co-reactants are simultaneously injected, at the inlet of a first fluid circuit, preferably provided with a mixer, and the chemical product obtained is recovered at the outlet of the first circuit. Amongst these known chemical reactors, some comprise a second fluid circuit, which is generally called a utility circuit and whose function is to thermally control the chemical reaction, either by providing the heat required for the reaction, or in contrast by discharging the heat released thereby. Such chemical reactors having two fluid circuits with utility are conventionally called exchangers/reactors.

The present invention relates to both the production of heat exchangers with only the function of thermal exchanges and the production of exchanger/reactors. Therefore, the term "heat exchanger having at least two fluid circuits" in the context of the invention is intended to be understood to be both a heat exchanger with a function only of thermal exchanges and an exchanger/reactor.

PRIOR ART

Existing heat exchangers, referred to as having plates, have significant advantages with respect to heat exchangers, referred to as having tubes, in particular their levels of thermal performance and their compactness as a result of a ratio of the surface-area to the volume of thermal exchanges which is advantageously high.

The known tube type exchangers are, for example, tube and shell exchangers in which a bundle of straight tubes or tubes bent in the form of a U or in the form of a helix is fixed to perforated plates and arranged inside a chamber which is referred to as a shell. In those exchangers having a tube and a shell, one of the fluids flows inside the tubes whilst the other fluid flows inside the shell. These tube and shell type exchangers have a significant volume and therefore have little compactness.

Known plate type exchangers are more compact and are obtained by stacking plates which comprise channels and which are assembled together.

The channels are produced by means of stamping plates, if necessary by the addition of sheets which are folded in the form of fins or by producing grooves. The production is carried out using mechanical means, for example, by means of milling, or a chemical method. The chemical production is conventionally called chemical or electrochemical etching.

The assembly of the plates with each other is intended to ensure the sealing and/or the mechanical strength of the exchangers, in particular the pressure resistance of the fluids flowing at the inner side.

Several assembly techniques are known and are used in accordance with the type of plate type exchanger desired. The assembly may thus be obtained using mechanical means, such as pulling members which retain the stack clamped between two thick and rigid plates which are arranged at the ends. The sealing of the channels is obtained by means of flattening of connected joints. The assembly may also be carried out by means of welding which is generally limited to the periphery of the plates, which sometimes requires, after the welding operation, that the exchanger be inserted into a grid in order to enable its pressure resistance with respect to fluids. The assembly may again be obtained by means of soldering, in particular for exchangers for which fins are added. The assembly may finally be obtained by means of diffusion welding.

The last two techniques mentioned enable exchangers to be produced which are particularly powerful in terms of mechanical strength. This is because, as a result of these two techniques, the assembly is obtained not only at the periphery of the plates, but also inside the exchanger.

The heat exchangers with plates which are assembled by means of diffusion welding have joints which are even more mechanically powerful than the joints of the exchangers which are obtained by means of soldering as a result of the absence of the additive metal required for the soldering.

The diffusion welding involves obtaining an assembly in the solid state by applying a force in the hot state to the components to be assembled for a given period of time. The force applied has a dual function: it enables the docking, that is to say, the bringing into contact of the surfaces to be welded, and it facilitates the elimination by means of creeping/diffusion of the residual porosity in the joints (interfaces).

The force may be applied by means of uniaxial compression, for example, using a press which is equipped with an oven or simply using masses which are arranged at the top of the stack of the components to be assembled. This method is conventionally called uniaxial diffusion welding and it is used industrially for the production of plate type heat exchangers.

A significant limitation of the uniaxial diffusion welding method is related to the fact that it does not allow joints of any orientation to be welded relative to the direction of application of the uniaxial compression force.

Another alternative method overcomes this disadvantage. In this other method, the force is applied via a pressurized gas to a sealed chamber. This method is generally referred to as Hot Isostatic Pressing (HIP). Another advantage of the method of diffusion welding by means of HIP compared with the uniaxial method of diffusion welding is that it is more widespread on an industrial scale. This is because HIP is also used for the batch processing of foundry components and for compacting powders.

Compact exchangers with plates obtained by diffusion welding which are currently known also have significant disadvantages which may be set out below.

A first major disadvantage is the production cost of the plates, in particular in the case of plates with fabricated channels. Though chemical etching enables a degree of reduction in costs compared with mechanical production, it is all relative: compared with a given length, the cost of a channel of a plate type exchanger produced by means of chemical etching is greater than that of a tube type exchanger. Furthermore, the chemical etching has a number of disadvantages, such as inadequate dimensional precision, a rounding of the edges which is unfavorable for diffusion welding or residual pollution of surfaces to be assembled owing to residues of pickling and masking products which have been used.

A second major disadvantage of compact exchangers with plates which have been welded by means of diffusion is the difficulty in finding a good compromise between the mechanical strength of the interface joints obtained, the acceptable deformation of the channels and the enlargement of the grain of the structural material This is because, in the method of uniaxial diffusion welding, it is possible to use a force of low or even very low value which deforms the channels to a small extent, on condition that the plates have good mutual contact and the low value of the force is compensated for by an increase of the welding temperature in order to eliminate the porosity at the interfaces. These conditions inevitably involve an enlargement of the grain of the material which may become prohibitive with respect to the corrosion resistance and the mechanical properties thereof. Furthermore, in numerous applications, it is critical for the number of grains of material located between two fluid circuits to exceed a minimum value in order to prevent the risks of leakage.

In the method of diffusion welding using HIP, the stack of components is encapsulated beforehand in a sealed container in order to prevent the gas from penetrating into the interfaces constituted by the surfaces to be welded. The gas pressure conventionally used is high, in the order of from 500 to 2000 bar, typically 1000 bar. The minimum operating pressure of the industrial chambers which are capable of implementing HIP is itself between 40 and 100 bar. Thus, the joints welded at this pressure are less resistant than those obtained at a higher pressure, for example, at 1000 bar, all the other conditions further being equal (material, temperature, surface state, etc.). Furthermore, this pressure between 40 and 100 bar is even greater for plates which have a large channel density, that is to say, plates whose contact surface determined with an adjacent plate is small compared with the total visible surface. This is because, for this type of plate, even a pressure of some tens of bar may be sufficient to bring about an unacceptable deformation of the channels. One possible solution may involve reducing the assembly temperature so that the material is more resistant to pressure, but this is equivalent to further decreasing the strength of the joints. Another possible solution may involve changing the configuration of the channels in order to make the stack more resistant to pressure, but this is equivalent to making the plate type exchanger less compact.

It should be noted that the transmission of the welding force into a stack of grooved plates is carried out in an unequal manner, whether the uniaxial diffusion welding method or the diffusion welding method using HIP is involved. This is because the portions of the interfaces located below the grooves are subjected to a reduced welding force since this is transmitted only via the two ribs or isthmuses which are located at one side and the other of each groove. Conversely, a high welding force is obtained with respect to the ribs. The quality of the interfaces may thus vary from one location to another of the stack.

Furthermore, for applications which are particularly demanding, it is necessary to be able to control at all locations of the stack the quality of the interfaces, for example, by means of non-destructive control. This is not possible with techniques which are currently available, other than in some very precise cases, for example, in the case of channels which are curved very slightly inward and which have sizes which are adequate to allow ultrasound control waves to pass through.

There are already known a number of solutions for producing heat exchangers by means of diffusion welding via HIP whilst controlling the geometry of the channels and the quality of the interfaces. The common point in these solutions is to produce a stack such that it is possible to leave the channels open during the HIP cycle. In this manner, the pressurization gas occupies all the inner space of the channels and consequently they do not become deformed or become deformed very little. It thus becomes possible to carry out the HIP at high pressure.

A first known solution involves using a tube for each channel, and welding at least one end thereof in a sealed manner to the container which is itself sealed. Each tube is inserted beforehand into a groove of a plate then the tubes which are inserted into the grooves of the same plate are sandwiched with another plate which may or may not be grooved and which is adjacent. One of the inventors of the present application has already implemented this solution [1]. The previous compulsory step of sealed welding of at least one end of each tube to the sealed container intrinsically involves a limited number and density of tubes. A major disadvantage of this solution is that it involves the channels of the exchanger being able to be produced in the form of tubes, which excludes complex shapes, such as, for example, shapes with rapid changes of direction which cannot be produced by means of bending. In this manner, in place of complex shapes, the channels are produced in more simple and less compact forms. That is to say, this first known solution impairs the compactness of a heat exchanger compared with a heat exchanger having grooved plates which are welded by means of diffusion in accordance with the prior art, as described in the preamble.

A second known solution is described in the patent application WO 2006/067349. This substantially involves preventing the interfaces to be welded from opening in the channels. In this manner, the solution according to this patent application involves producing in metal plates grooves having a cross-section which is open at the tops thereof, then blocking them individually by means of welding of a thin metal plate, thus leaving one end or the two ends of the grooves accessible to the pressurization gas. The problem of welding the ends of the channels is simplified relative to the first known solution, but at the expense of the requirement to weld one plate per channel. This may be laborious, costly and difficult to implement in the case of a large number of channels per exchanger.

A third known solution is described in the patent application WO 2011/026925. The following steps are carried out:

depositing on a grooved plate a continuous bead of material in relief at the periphery of each groove and another continuous bead which is also in relief at the periphery of the plate, stacking grooved plates with their continuous beads in a container without the grooves having an opening end;

sealing the container;

application of a low pressure HIP cycle during which the sealing of each channel delimited individually by at least one groove is obtained using diffusion welding of the continuous beads;

drilling channels in order to allow the pressurization gas to penetrate into each channel;

application of a high-pressure HIP cycle in order to confer on the joints good mechanical properties by means of diffusion welding of the surfaces delimited by the continuous beads.

As for the known solution in accordance with the patent application WO2006/067349, this last known solution may be laborious, costly and difficult to implement in the case of a large number of channels per exchanger.

A fourth solution has been envisaged by the Applicant. This solution is described and claimed in the patent application WO2013/150458. It substantially involves producing two groups of metal tubes of elongate form, of which a first end is blind and a second end opposite the first, which is open, aligning the tubes of each group by positioning them side by side, stacking the groups in an alternating manner with head-to-foot positioning and offset in order to create occurrences of play, filling each play with plates or metal plates, then encapsulating the stack formed in this manner with a casing formed by metal plates. In this manner, the sealed welding of the peripheries of the interfaces is simplified while leaving open the second end of each tube, thus making it possible to apply a high pressure HIP cycle. This solution, as also the first solution set out above, is not suitable for the production of exchangers having channels of complex geometry and/or small dimensions such as those produced from metal sheets or grooved plates, as a result of the possible intrinsic shape of the tubes.

There is therefore a need to further improve the production methods for heat exchangers by diffusion welding, in particular in order to obtain compact exchangers, with channels having a complex geometry and/or small dimensions, to improve the mechanical strength of their joints without bringing about an excessively powerful deformation of the channels, nor unacceptable enlargement of the grain of the structural material, in order to be able to control, at any location of the exchangers, the quality of the joints, for example, by means of non-destructive control, and to have acceptable production costs and an ease of implementation.

An object of the invention is to at least partially meet this requirement.

STATEMENT OF INVENTION

To this end, the invention relates to a method for producing a heat exchanger module having at least two fluid circuits which each comprise channels, comprising the following steps:

a/ producing one or more elements of one of the two fluid circuits, referred to as the first circuit, each element of the first circuit comprising at least two metal plates, at least one of which comprises first grooves;

b/ stacking the metal plates of each element so that the first grooves form the channels of the first circuit;

c/ assembling the stacked metal plates of each element of the first circuit by means of diffusion welding;

d/ producing one or more elements of at least one other fluid circuit, referred to as the second circuit, each element of the second circuit comprising at least a portion of the channels of the second circuit;

e/ assembling by means of diffusion welding or by means of soldering, or by means of diffusion soldering between the element(s) of the first circuit and the element(s) of the second circuit.

The term "soldering diffusion" is intended to refer to the usual definition of a person skilled in the art, as set out in the publication [2].

In this manner, the invention is substantially a method for producing a heat exchanger having at least two fluids, with an intermediate assembly by means of diffusion welding, preferably using HIP, of the elements of the first fluid circuit produced from grooved plates.

The intermediate diffusion welding for the elements of the first fluid circuit enables provision of a welding force which is dedicated purely thereto, without the need to simultaneously weld the elements of the second fluid circuit. That is to say, the welding force is applied individually to each element of the first circuit which, in contrast to the methods according to the prior art, is not reduced, that is to say, screened, by the presence of the elements of the second fluid circuit.

By virtue of the invention, as a result of the fact that the welding force in the assembly step c/ is applied independently to each of the elements of the first fluid circuit, it is possible to envisage initial thicknesses of plates of the elements which are relatively large in order to reduce to a maximum extent the deformation of the channels formed by their grooves. Then, before step e/ for assembly with the element(s) of the second fluid circuit, it is possible to reduce exactly as necessary, for example, by means of processing, the thicknesses of these plates of each element of the first circuit in order to have the desired wall thickness between elements of the first circuit and those of the second circuit.

In this manner, with plate thicknesses which are initially greater for each element of the first circuit, it is possible to increase the welding force and/or the welding temperature, therefore the quality of the joints, and to find the best compromise between the performance levels of the joints, grain enlargement and deformation of the channels of the first fluid circuit.

Furthermore, it is possible to define channels of complex geometry and/or small sizes for each element of the first fluid circuit.

The method according to the invention enables heat exchangers to be obtained having at least two fluid circuits, which are compact and of which the independent assembly by means of diffusion welding, preferably using HIP, at relatively low pressure of each element of the first fluid circuit prior to the assembly with the element(s) of the second fluid circuit enable neither crushing of the channels, nor excessive deterioration of the structural material as a result of unacceptable grain enlargement to be produced.

Furthermore, the cost and the ease of implementation of the method according to the invention are acceptable.

The metal material which constitutes each element of the first and second fluid circuit, and the fluid collectors which are connected by means of welding, is selected in accordance with the conditions for use required for the exchanger module, that is to say, the pressure of the fluids, the temperatures and nature of the fluids which flow through the module. This may, for example, be aluminum, copper, nickel, titanium or alloys of these elements and a steel, in particular an alloyed steel or a stainless steel or a refractory metal selected from alloys of niobium, molybdenum, tantalum or tungsten.

The fluid circulation channels have a width and a height which is dependent in particular on the nature and the characteristics of the fluids conveyed and the desired heat exchange. The widths and heights may in particular vary along the path of the channels. Generally, compact exchanger modules according to the invention comprise channels whose dimensions vary from 0.1 mm to 10 mm, preferably from 1 to 5 mm. To this end, the thicknesses of a metal plate of an element of the first circuit used in steps a/ to c/ according to the invention may vary from 0.1 to 15 mm, preferably from 1 to 10 mm. Finally, the path of the channels over their length may or may not be straight, and may form bends or patterns, for example, in the form of a zig-zag.

The production of the metal plates which constitute each element of the first circuit may implement methods which are dependent on the geometry which it is desirable to give to the channels of the first circuit. For example, if channels having a constant rectangular cross-section with rounded corners are desirable, it is preferable to produce grooves in two plates which constitute a single element. The channels are formed by stacking two plates one on the other with positioning of the grooves of each plate opposite each other. If, in contrast, channels with acute angles are desired, it is preferable to sandwich between two plates which are not grooved an intermediate plate which has patterns which are recessed by a technique of laser cutting or by means of chemical through-etching.

In order to form the channels, the stacking according to step b/ of the plates which constitute each element of the first circuit forming the channels is produced. To this end, it is possible to use centering pins or to wedge the plates at their edges and to fix them, for example, by means of welding.

Preferably, prior to the stacking, that is to say, before step b/, a step a1/ of cleaning the plates of each element of the first circuit is carried out. The cleaning may be carried out, for example, using detergents or solvents.

According to an advantageous embodiment, after step b/, a step b1/ of sealing the periphery of the at least two metal plates of each element is carried out, then a step b2/ of degasification of the inner side of each sealed stack is carried out through an opening hole at each interface between plates, a step b3/ of closing the opening hole is carried out and finally step c/ is carried out by application of a hot isostatic pressing cycle (HIP) at relatively low pressure to each stack which is sealed and degasified. The degasification of the channels and the interface(s) is carried out by placing in a state of reduced pressure, through the opening hole, then it is blocked.

According to this method, according to an advantageous variant, the step b1/ is carried out by welding the periphery of each stack.

Still according to this method, the step b1/ is carried out in an alternative manner by means of insertion of each stack into a metal casing, referred to as a container, then a step of welding the container, the opening hole also opening in a tube, referred to as a pumping port, which is welded to a face of the container, the step b2/ being carried out via the pumping port and step b3/ being carried out by welding the pumping port. The tube or pumping port which is welded to the container may also be welded to one of the plates opposite the hole which opens in the interfaces. In order to carry out the degasification operation, this pumping port is connected to a vacuum pump, the pumping is carried out at a specific temperature, between ambient temperature and approximately, 400° C., then the pumping port is closed by means of welding, without being placed in air again.

The cycle of the HIP type comprises a heating operation and a pressurisation operation which are most often simultaneous, a temperature and pressure maintenance level, then a cooling operation and a depressurisation operation. This cycle is selected in particular in accordance with the material (s) of the plates which constitute elements of the first circuit. In particular, it is possible to select the maintenance temperature and the heating and pressurisation speeds (of cooling and depressurisation, respectively) in particular taking into account the capacities of the HIP chamber used.

The HIP cycle according to step c/ is preferably carried out at a pressure of between 20 and 500 bar, preferably between 40 and 200 bar. The selection of the pressure results from a compromise between welding quality to be obtained and acceptable deformation of the channels. This HIP cycle is referred to as a relatively low-pressure cycle since the pressures are lower than those of an HIP cycle which is referred to as a high-pressure cycle, that is, between 500 and 2000 bar, advantageously between 800 and 1200 bar.

The HIP cycle according to step c/ is preferably again carried out at a temperature of between 500 and 1200° C. The temperature which is used is dependent on the material which constitutes the plates used and the maximum permissible grain size. According to another advantageous embodiment, the step c/ is carried out by means of uniaxial compression. In this manner, according to this other method, each stack produced according to step b/ is placed in an oven then it is heated in accordance with a cycle which is dependent on the material as for the other method via HIP, and a force is applied either from the beginning of the heating or during heating, or during a maintenance level. The stack is then cooled. As for the method using HIP, the selection of the force results from a compromise between welding quality to be obtained and acceptable deformation of the channels.

According to this other method, the step c/ is preferably carried out with a compression force of between 1 and 500 kg/cm$^2$, preferably between 10 and 250 kg/cm$^2$.

Regardless of the method, the step c/ is preferably carried out for a time period of between 15 minutes and a few hours, preferably between 30 minutes and 2 hours. The duration of an HIP maintenance level may be from 15 minutes to several hours, preferably from 30 minutes to 2 hours. The heating and pressurisation times (for cooling and depressurisation, respectively) are dependent on the characteristics and possibilities of the equipment (chamber) used; they are generally several hours.

After step c/, it is possible to carry out a step c1/ of reduction of thickness, preferably by means of processing, of at least one assembled metal plate. In this manner, as mentioned above, it is possible to reduce the deformation of the channels of the first fluid circuit by determining a thickness which is sufficiently large for the walls which separate channels from the outer side. This thickness is then reduced in accordance with this step c1/. With thicknesses of plates which are initially larger, it is possible to advantageously increase the welding force and/or the welding temperature and therefore the quality of the joints and consequently to find the best compromise between performance levels of the joints, grain enlargement and deformation of the channels.

After step c/ or where applicable step c1/, a step c2/ of opening the channels of the first circuit toward the outer side is carried out. The opening of the channels of the first circuit, in the same manner as the subsequent opening of the channels of the second circuit, may be carried out by means of drilling or by cutting the end of the plates which close them.

According to an advantageous variant, after the step c2/ of opening, a step c3/ of application of a hot isostatic pressing cycle (HIP) at high pressure to each stack which has already been assembled is carried out. This variant is advantageous since, on the one hand, carrying out an HIP cycle at high pressure enables the elements of the first fluid circuit to be consolidated, which may be found to be advantageous since the pressure during the subsequent step d2/ may have a tendency to deform the elements. On the other hand, a control preferably by means of ultrasound after a high-pressure HIP cycle in accordance with step c3/ enables the conformity of the assembly to be verified.

The HIP cycle according to step c3/ is preferably carried out at a pressure of between 500 and 2000 bar, preferably between 800 and 1200 bar. This cycle according to the step c3/ is intended to complete the assembly for each element of the first fluid circuit.

After step c/, or where applicable step c1/, or where applicable before and/or after step c3/, a step c4/ of non-destructive control of the channels of the first circuit is carried out, preferably by means of ultrasound. This non-destructive control is carried out by means of displaying the faces opposite those which comprise the grooves. Preferably, this control is carried out before and after the HIP cycle at high-pressure (step c3/): it enables the presence of any faults following the HIP cycle at low-pressure (step c/) to be shown and to be eliminated during the high-pressure HIP cycle. The non-elimination of these defects may be a reason for rejection of an element of the first circuit. The method according to the invention thus enables non-destructive control which may be systematic and which may not be carried out on stacks of metal sheets or grooved plates which are welded by means of diffusion according to the prior art.

Several embodiments and variants are possible for the formation of the channels of the second fluid circuit according to step d/:
  that is, for each element of the second circuit, via a step d1/ of stacking at least two metal plates, at least one of which comprises second grooves which form a portion of the channels of the second circuit, then a step d2/ of assembly by means of diffusion welding between the at least two stacked metal plates of each element of the second circuit. The second grooves may be produced by grooving at least one main face or the two main faces of each element of the first circuit opposite those which form the channels of the first circuit. Alternatively, the second grooves may be produced by means of grooving of main faces of metal plates which are separate from the elements of the first circuit;
  that is, for each element of the second circuit, via a step d'1/ of insertion of tubes which are arranged parallel with each other and which form a portion of the channels of the second circuit.

Step e/ is preferably carried out by means of application of a hot isostatic pressing cycle (HIP) at high pressure between the element(s) of the first circuit and the element(s) of the second circuit, the channels of both the first circuit and the second circuit being open toward the outer side. The HIP cycle according to step e/ is advantageously carried out at a pressure of between 500 and 2000 bar, preferably between 800 and 1200 bar. The transmission of the welding force to the elements of the second circuit which are stacked on those of the first is carried out by the pressure of gas not only at the outer faces thereof but also via the inner side of the channels of the first fluid circuit. In this manner, the welding force is particularly well distributed and the welding of the elements of the second circuit or the other additional circuits is greatly facilitated.

Between the step d/ and e/, the channels of the first circuit being open toward the outer side and those of the second circuit formed, step d2/ is carried out by application of a hot isostatic pressing operation (HIP) at relatively low pressure between the element(s) of the first circuit and the element(s) of the second circuit. This step d2/ is carried out if the second fluid circuit is formed other than with tubes, that is to say, by means of grooving. The application of the HIP cycle with the channels of the first open circuit enables provision of a good transmission of the welding force to the interfaces of the second fluid circuit.

Advantageously, it is possible to provide a step f/ of welding fluid collectors to the module assembled in accordance with step e/, a fluid collector being capable of distributing or recovering a fluid which flows in the first or the second circuit. The invention also relates to a heat exchange module having at least two fluid circuits obtained in accordance with the method as described above.

The invention finally relates to a heat exchanger system which comprises a plurality of modules as above, which are connected to each other.

Finally, the invention relates to the use of an exchanger module as above or the system above as part of a heat exchanger of a nuclear reactor, such as a liquid metal cooled reactor (LMFR).

DETAILED DESCRIPTION

Other advantages and features of the invention will be better appreciated from a reading of the detailed description of embodiments of the invention given by way of non-limiting illustration with reference to the following Figures, in which:

FIG. 2 is a perspective cross-section of an element of the first fluid circuit produced from two metal plates according to FIG. 1;

FIG. 2A is a cross-section of the element of the first fluid circuit according to FIG. 2;

FIG. 4 is a perspective view of a stack of eleven elements according to FIG. 3 and two additional plates at one side and the other of these eleven elements in order to form the exchanger module according to the invention;

FIG. 4A is a perspective cross-section of the stack according to FIG. 4 before it is subjected to an HIP cycle according to the invention;

The terms "longitudinal" and "lateral" are intended to be considered in relation to the geometric shape of the metal plates which determine the geometric shape of the stacks of the heat exchanger module according to the invention. In this manner, in the end the four longitudinal sides of the stack of the exchanger module according to the invention are those which extend parallel with the longitudinal axis X of the plates, that is to say, along their length L. The two lateral sides of the stack are those which extend along the lateral Y axis of the plates, orthogonally with respect to the X axis, that is to say, along their width 1 or 1'.

It is set out that, in FIGS. 3, 3A, 4, 4A and 5A, no interface has been illustrated between the plates which constitute the elements of the circuit 1 since at this stage they are welded. In the same manner, in FIG. 5, the interfaces of the circuit 2 have not been illustrated.

EXAMPLE 1

Figure 1:
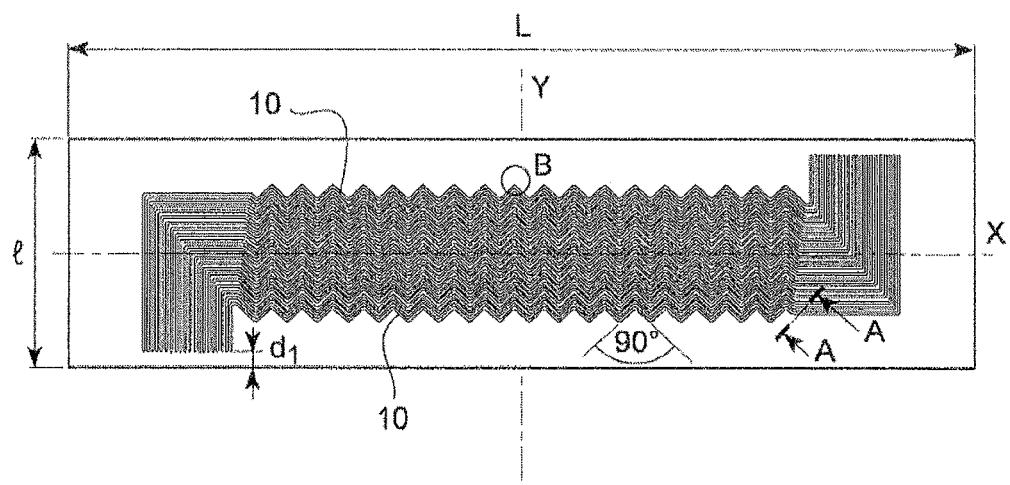
FIG. 1 is a front view of a metal plate of an element of a first fluid circuit C1 from which a first example of the production method of a heat exchanger module having two fluid circuits according to the invention is implemented.
Figure 1A:
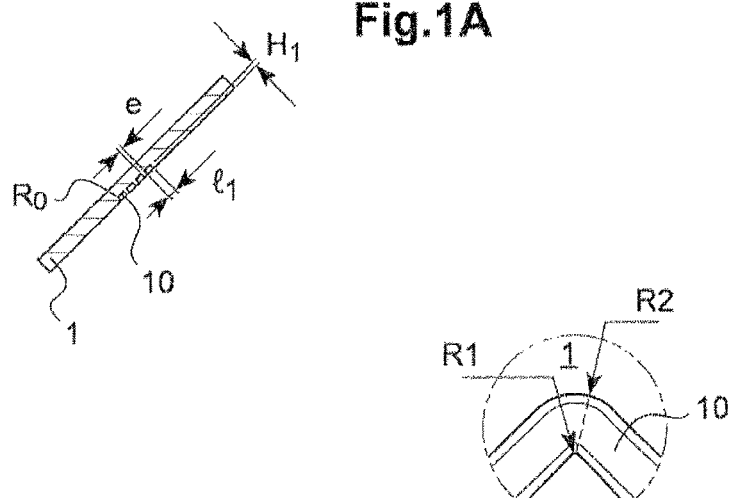
FIG. 1A is a sectioned view along A-A of the plate according to FIG. 1.
Figure 1B:
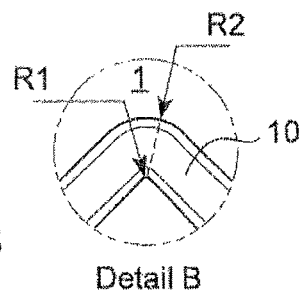
FIG. 1B is a detailed view along B of the plate according to FIG. 1.

Step a/: In order to produce an element 2 of a first fluid circuit C1, two mutually identical metal plates 1 are produced having rectangular shapes L*1 and a thickness H, grooves 10 having a depth H1, a width 11 and specific spacing e (FIGS. 1, 1A, 1B). The processing operations of the grooves of the two plates 1 are carried out in accordance with two patterns in a mirror image of each other: as illustrated in FIG. 1, these may advantageously be zig-zag patterns with bends of 90° and inclinations of 45° relative to the longitudinal axis X of the plates 1.

By way of example, the plates 1 are of stainless steel 1.4404, the dimensions L*1*H of a plate 1 are equal to 602*150*4 mm, the dimensions H1*11 of the grooves are equal to 1*2 mm with tolerances which are equal to ±0.02 mm and ±0.05 mm, respectively, the radii of curvature of the grooves R0, R1, R2 are equal to 0.3 mm, 0.1 mm and 2.1 mm, respectively, the distance e between two consecutive grooves, that is, the width of an isthmus, is equal to 1 mm with a tolerance which is equal to ±0.05 mm. The distance d1 between the end of the grooves 10 and a longitudinal edge of a plate 10 is equal to 11 mm.

Step a1/: a cleaning of the plates 1 is carried out using solvents and detergents.

Step b/: after having cleaned them, the two plates 1 are stacked in order to reconstitute an element 2 of the first circuit C1 comprising a series of channels 11 in a zig-zag arrangement having a height equal to 2*H1, that is, 2 mm in the example (FIGS. 2 and 2A). The two plates 1 are aligned relative to each other using centering pins which are not illustrated.

Step b1/: the periphery of each element 2 which is constituted by the two metal plates 1 which are stacked one on the other forming channels is sealed by means of welding.

Step b2/: the interface between the two plates of each sealed stack through an opening hole is degasified.

Step b3/: the opening hole is closed.

Step c/: a batch of eleven identical stacks 2 is subjected to a so-called low-pressure HIP cycle, comprising heating for 2 hours at 1020° C. at 100 bar, a maintenance level of one hour at 1020° C. at 100 bar then cooling for several hours and finally depressurization.

Step c2/: The longitudinal sides of the eleven elements 2 of the first circuit are then processed so as to open toward the outer side the ends of the channels 11 which are formed by the grooves 10. The opening of the channels 11 is produced by means of cutting the ends of the element 2 which close them, that is to say, by cutting a longitudinal strip having a width which is substantially equal to the distance d1, over the entire length L of each element 2. The width 1' of each element 2 is thus equal to 1−2*d1, that is to say, 128 mm in the example above.

There are thus obtained eleven elements 2 of the first fluid circuit which it is possible to readily control individually by means of ultrasound or radiography.

Step c3/: after the opening step c2/, a so-called high-pressure hot isostatic pressing (HIP) cycle is applied to each of the stacks 2 which have already been assembled. This high-pressure HIP cycle involves heating for 3 hours at 1080° C. at 1000 bar for 3 hours.

Eleven elements 2 of the first fluid circuit C1 are thus obtained which it is possible to readily control individually by means of ultrasound or radiography.

A new control of each of the eleven elements 2 is preferably carried out by means of ultrasound.

Figure 3:
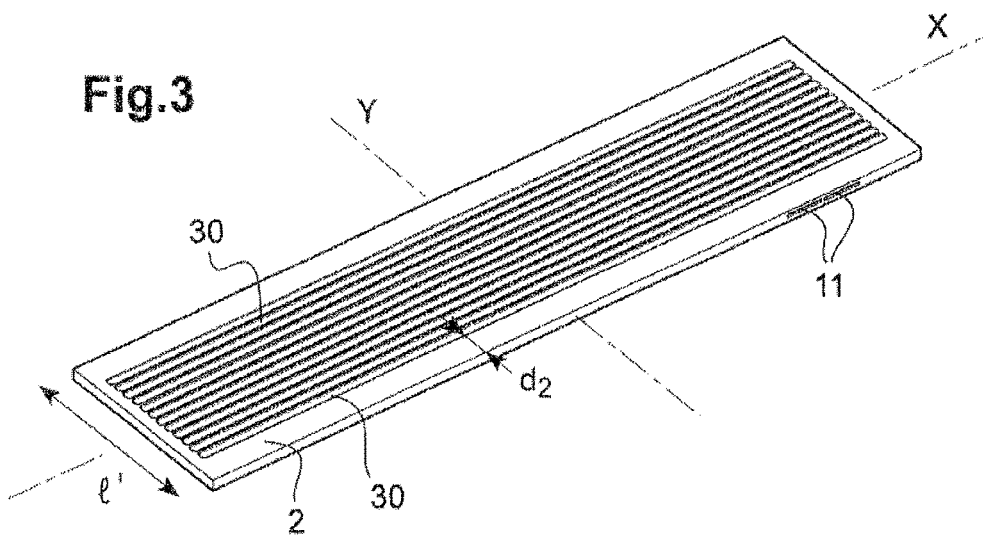
FIG. 3 is a perspective view of an element of the first fluid circuit according to FIG. 2 which has been grooved on the main faces thereof in order to form the channels of the second fluid circuit C2 of the heat exchange module according to the invention.
Figure 3A:
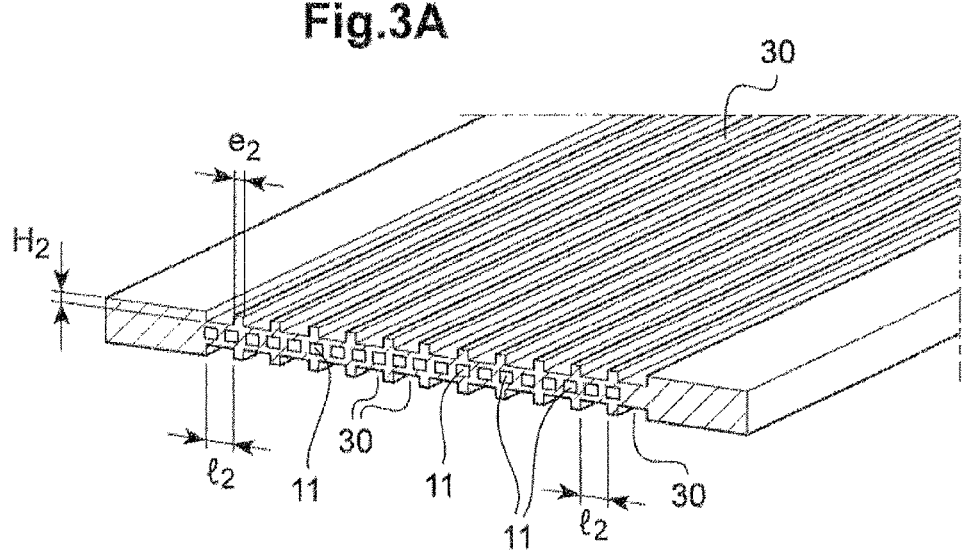
FIG. 3A is a perspective cross-section of an element of FIG. 3 showing both the channels of the first fluid circuit C1 and the grooves in order to form the channels of the second fluid circuit C2.

Step d/:

Step d1/: The two main faces of each of these eleven elements 2 of the first circuit obtained and only one main face of two additional plates 4 are then grooved in order to reconstitute the channels of a second fluid circuit C2 therein. The second grooves 30 do not open at the outer side (FIG. 3). By way of example, each groove 30 has a width I2 equal to 5.75 mm, a depth (height) H2 equal to 1.75 mm, and is separated from a consecutive groove 30 by an isthmus (rib) having a width e2 equal to 1.75 mm. The distance d2 between the end of the grooves 30 and a lateral edge of an element 2 is equal to 11 mm.

After having cleaned all the elements, they are stacked in order to obtain a superimposition of eleven elements 2 of the first fluid circuit C1 and twelve elements 3 of the second fluid circuit C2 whose channels 31 are formed by the second grooves 30 (FIG. 4). The elements are aligned using centering pins which are inserted into blind holes.

Then, the periphery of the complete stack 5 is sealed and each interface is degasified via an opening hole which is blocked. In order to produce the sealing at the periphery of the stack, it is possible either to arrange the complete stack 5 in a container leaving openings opposite the channels 11 of the first circuit C1, or to weld the periphery of all the plates 1 which constitute the stack 5.

Step d2/: The complete stack is subjected to a low-pressure HIP cycle involving heating for 2 hours at 1020° C. at 100 bar, a maintenance level of three hours at 1020° C. at 100 bar, then cooling for several hours and depressurization.

During this second HIP cycle, the channels 11 of the first fluid circuit are filled by the pressurized gas of the chamber which implements the HIP cycle, which enables good transmission of the welding force to the interfaces of the plates 1 which form the channels 31 of the second fluid circuit C2.

The channels 31 of the second fluid circuit C2 are then opened by processing the lateral sides of the module constituted by the complete stack 5. The opening of the channels 31 is carried out by cutting the ends of the stack 5 which block them, that is to say, by cutting a lateral strip at one side and the other of the stack over the entire width 1', the strip having a width which is substantially equal to the distance d2. The length L' of the stack 5 is thus equal to L−2*d2, that is, 580 mm in the example mentioned above.

Figure 5:
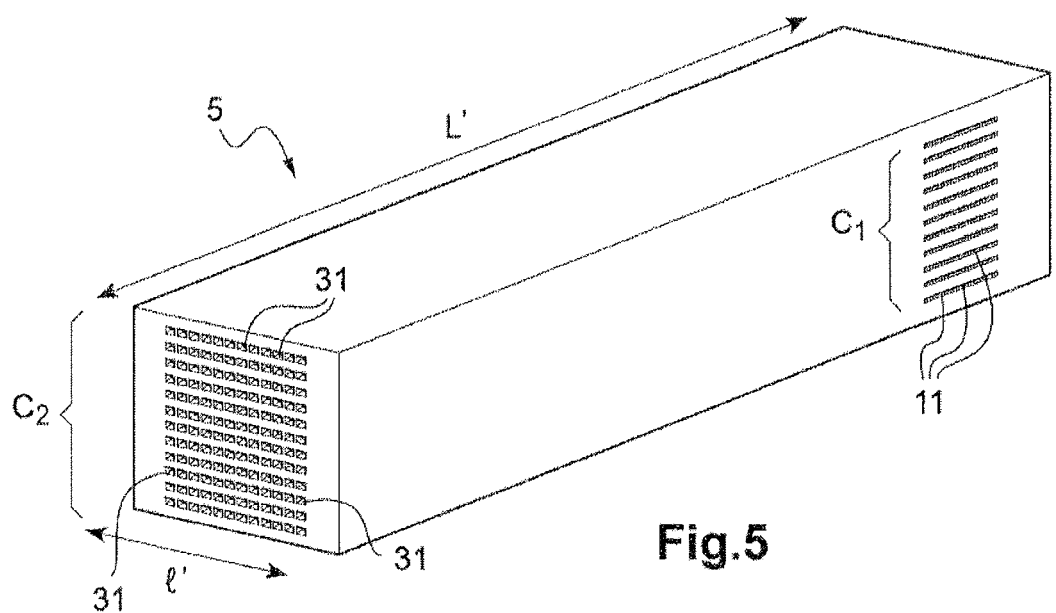
FIG. 5 is a perspective view of the stack of FIG. 4 after it has been subjected to a low-pressure HIP cycle and a high-pressure HIP cycle in accordance with the invention and after cutting the lateral edges thereof in order to open the channels of the second fluid circuit C2.

The channels 31 of the second circuit C2 are thus open over each of the lateral edges of the stack 5 whilst the channels 11 of the first circuit C1 are open over each of the longitudinal edges of the stack 5 (FIG. 5).

Step e/: Following the processing, that is to say, once the channels 31 of the second fluid circuit are open toward the outer side of the stack, an HIP cycle at 1080° C. is applied to the module obtained in this manner at 1000 bar for 3 hours in order to eliminate the residual defects in the welded joints.

Step f: Finally, fluid distribution collectors which are not illustrated are connected by means of welding in order to supply and/or recover a fluid in each of the first C1 and second C2 circuits in the region of the ends of the grooves which form the channels 11, 31.

As a result of the method according to steps a/ to f/, a heat exchange module which is compact and assembled by means of diffusion welding using HIP is produced.

Such a heat exchange module according to example 1/ may be considered to have fluid circulation channels of small dimensions and with complex geometries (in zig-zag form).

By way of example, an exchanger module according to example 1/ may be a rectangular parallelepiped having two square faces. The dimensions of such a module may be equal to 580×128×104 mm.

EXAMPLE 2

The same steps are carried out as for the example 1, with the difference that, in addition, the main faces of the eleven elements 2 of the first circuit C1 are processed until the wall thickness between the base of the grooves 10 and the exterior is equal to half the desired thickness between each of the two circuits C1, C2.

A stack 5 is produced by interposing between the eleven elements 2 of the first fluid circuit C1 the twelve elements 30, 4 of the second fluid circuit which have been produced and processed in accordance with the same principle.

Then, the periphery of the planar faces obtained in this manner is welded, they are degasified and a high-pressure HIP cycle is applied at 1080° C. at 1000 bar for 3 hours.

EXAMPLE 3

The same steps are carried out as for example 1, with the difference that, in addition, the main faces of the eleven elements 2 of the first circuit C1 are processed until the wall thickness between the base of the grooves 10 and the outer side is equal to half of the desired thickness between each of the two circuits.

Figure 6:
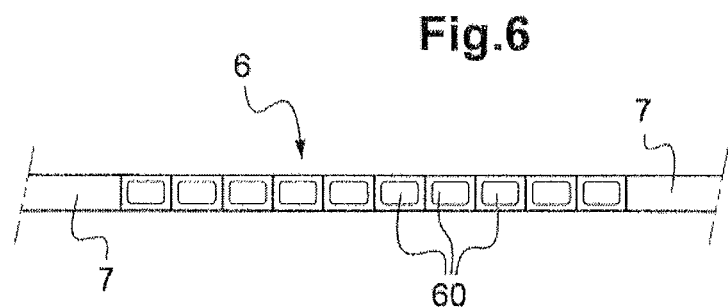
FIG. 6 is a cross-sectional view of another embodiment of an element of the second fluid circuit, different from the production in accordance with the preceding Figures.

There are ten elements of the second fluid circuit C2 in this instance which are each constituted by a sheet 6 which is itself constituted by square rectified tubes 60 which are arranged parallel with each other and two bars 7 of the same thickness as the tubes, which are added parallel with the tubes at each side of the sheet 6 (FIG. 6). The outer dimensions of a sheet 6, that is, the width and the length, are equal to those of a grooved plate 1 which constitutes an element 2 of the first circuit C1.

A stack is then produced by interposing between two consecutive elements 2 of the first circuit C1 a sheet 6 of rectified square tubes 60 which are butt-jointed to each other.

The periphery of the interfaces obtained in this manner is welded, they are degasified, then an HIP cycle is applied at 1080° C., 1000 bar for 3 hours.

Of course, the present invention is not limited to the described variants and embodiments provided by way of illustration and non-limiting example.

The channels may also have a geometry other than a zig-zag pattern as illustrated in FIG. 1 whilst being elongate.

The size of the channels for each of the fluid circuits may be different depending on the nature and the properties of the fluids to be conveyed, the permissible pressure drops and the output desired. It is possible to stack a plurality of elements of the same circuit in order to optimize a functionality of the exchanger, for example, the thermal exchange or the flow of one of the fluids.

Though the examples illustrated 1/ to 3/ relate to exchangers having precisely two fluid circuits, it is quite possible to produce an exchanger having three fluid circuits or more.

The two fluid collectors may be arranged at one side and the other of the stack which constitutes the module, or alternatively at the same side of the stack.

The heat exchanger modules obtained in accordance with the method of the invention may be assembled one on the other, for example, by using flanges or by welding the fluid supply pipes. It is thus possible to envisage producing a heat exchange system which has a plurality of modules which are connected to each other and in which the exchanges are carried out in a plurality of steps with different mean temperatures or temperature deviations per module which are sufficiently small to reduce the thermal stresses in the materials. For example, in the case of a heat exchanger in which it is desirable to transfer the heat of a first fluid to a second, it is possible to configure a modular exchanger system in which each module enables the temperature of the first fluid to be reduced by a specific value, thus limiting the stresses relative to the case of a configuration with a single module which has a higher temperature deviation. To this end, the inlet temperature of the second fluid may differ from one module to another. In another example, a modular reactor/exchanger system enables a complex chemical reaction to be carried out in stages by controlling precisely the reaction temperature at each stage, for an optimum control of the chemical reaction, a minimization of the risks and a maximization of the output.

A heat exchanger system having a plurality of modules also enables the maintenance costs to be reduced, by allowing the individual replacement of a defective module or the production costs by means of standardization of the modules.

REFERENCES MENTIONED

[1] <<Fusion reactor first wall fabrication techniques by G. Le Marois, E. Rigal, P. Bucci, (Fusion Engineering and Design pp 61-62 (2002) 103-110 Elsevier Science B.V);
[2] <<Assemblage par diffusion>>—Techniques de l'ingénieur [BM 7747].

The invention claimed is:
1. A method for producing a heat exchanger module having at least two fluid circuits which each comprise channels, comprising the following steps:
  a/ producing one or more elements of one of the two fluid circuits, referred to as the first circuit, each element of the first circuit comprising at least two metal plates, at least one comprises first grooves and at least one being a flat plate or the at least two metal plates comprise first grooves;
  b/ stacking the at least two metal plates of each element so that the first grooves of one of the plates and the at least one flat plate or the grooves of the at least two metal plates define outer peripheral surfaces of the channels of the first circuit;
  c/ assembling by means of diffusion welding between the at least two stacked metal plates of each element of the first circuit;
  d/ producing one or more elements of at least one other fluid circuit, referred to as the second circuit, each element of the second circuit comprising at least a portion of the channels of the second circuit;

e/ assembling by means of diffusion welding or by means of soldering, or by means of diffusion soldering, between the element(s) of the first circuit and the element(s) of the second circuit.

2. The method as claimed in claim 1, according to which, after step c/, a step c2/ of opening the channels of the first circuit toward the outer side is carried out.

3. The method as claimed in claim 2, according to which, after step c2/, a step c3/ of application of a hot isostatic pressing cycle (HIP) at a pressure of between 500 and 2000 bar to each stack which has already been assembled is carried out.

4. The method as claimed in claim 3, according to which, before and/or after step c3/, a step c4/ of non-destructive control of the channels of the first circuit is carried out.

5. The method as claimed in claim 1, according to which after step b/, a step b1/ of sealing the periphery of the at least two metal plates of each element is carried out, then a step b2/ of degasification of the inner side of each sealed stack is carried out through an opening hole at each interface between plates, a step b3/ of closing the opening hole is carried out, and finally step c/ is carried out by application of a hot isostatic pressing cycle (HIP) at relatively low pressure to each stack which is sealed and degasified.

6. The method as claimed in claim 5, according to which step b1/ is carried out by welding the periphery of each stack.

7. The method as claimed in claim 5, according to which step b1/ is carried out by means of insertion of each stack into a metal casing, referred to as a container, then a step of welding the container, the opening hole also opening in a tube, referred to as a pumping port, which is welded to a face of the container, step b2/ being carried out via the pumping port and step b3/ being carried out by welding the pumping port.

8. The method as claimed in claim 5, the HIP cycle according to step c/ being carried out at a pressure of between 20 and 500 bar.

9. The method as claimed in claim 5, the HIP cycle according to step c/ being carried out at a temperature of between 500 and 1200° C.

10. The method as claimed in claim 1, according to which, after step c/, a step c1/ is carried out of reduction of thickness, of at least one assembled metal plate.

11. The method as claimed in claim 10, according to which, after step c1/, a step c2/ of opening the channels of the first circuit toward the outer side is carried out.

12. The method as claimed in claim 10, according to which, after step c1/, a step c4/ of non-destructive control of the channels of the first circuit is carried out.

13. The method as claimed in claim 1, according to which step d/ is carried out, for each element of the second circuit, via a step d1/ of stacking at least two metal plates, at least one of which comprises second grooves which form a portion of the channels of the second circuit, then a step d2/ of assembly by means of diffusion welding between the at least two stacked metal plates of each element of the second circuit.

14. The method as claimed in claim 13, according to which the second grooves are produced by grooving at least one main face or the two main faces of each element of the first circuit opposite those which form the channels of the first circuit.

15. The method as claimed in claim 13, according to which the second grooves are produced by grooving main faces of metal plates which are separate from the elements of the first circuit.

16. The method as claimed in claim 1, step c/ being carried out by means of uniaxial compression.

17. The method as claimed in claim 16, step c/ being carried out with a compression force of between 1 and 500 kg/cm$^2$.

18. The method as claimed in claim 1, according to which before step b/, a step a1/ of cleaning the plates of each element of the first circuit is carried out.

19. The method as claimed in claim 1, step c/ being carried out for a duration of between 15 minutes and 2 hours.

20. The method as claimed in claim 1, according to which, after step c/, a step c4/ of non-destructive control of the channels of the first circuit is carried out.

21. The method as claimed in claim 1, according to which step d/ is carried out, for each element of the second circuit, via a step d1/ of inserting tubes which are arranged parallel with each other and which form a portion of the channels of the second circuit.

22. The method as claimed in claim 1, according to which step e/ is carried out by means of application of a hot isostatic pressing (HIP) cycle at a pressure of between 500 and 2000 bar, between the element(s) of the first circuit and the element(s) of the second circuit, the channels of both the first circuit and the second circuit being open toward the outer side.

23. The method as claimed in claim 1, according to which, between step d/ and e/, the channels of the first circuit being open toward the outer side and those of the second circuit formed, step d2/ is carried out by application of a hot isostatic pressing cycle (HIP) at a pressure of between 20 and 500 bar, between the element(s) of the first circuit and the element(s) of the second circuit.

24. The method as claimed in claim 1, comprising a step f/ of welding fluid collectors to the assembled module according to step e/, a fluid collector being capable of distributing or recovering a fluid which flows in the first or the second circuit.

25. A heat exchange module having at least two fluid circuits obtained in accordance with the method as claimed in claim 1, wherein one of the fluid circuits, referred to as the first circuit comprises outer peripheral surfaces of channels defined by first grooves of at least one plate and at least one flat plate stacked or by first grooves of at least two metal plates stacked.

26. A heat exchanger system comprising a plurality of modules as claimed in claim 25, which are connected to each other.

27. An exchanger module as claimed in claim 25 as part of a heat exchanger of a nuclear reactor.

* * * * *